United States Patent [19]
Willard, Jr.

[11] Patent Number: 5,427,166
[45] Date of Patent: Jun. 27, 1995

[54] RUN-FLAT TIRE WITH THREE CARCASS LAYERS

[75] Inventor: Walter L. Willard, Jr., Greenville, S.C.

[73] Assignee: Michelin Recherche et Technique S.A., Granges-Paccot, Switzerland

[21] Appl. No.: 182,995

[22] Filed: Jan. 18, 1994

[51] Int. Cl.⁶ .................... B60C 3/00; B60C 15/00; B60C 15/024; B60C 17/06
[52] U.S. Cl. .................. 152/454; 152/517; 152/526; 152/531; 152/536; 152/539; 152/540; 152/543; 152/544; 152/546; 152/547; 152/548; 152/549; 152/550; 152/553; 152/554; 152/555; 152/556; 152/557
[58] Field of Search ............... 152/517, 555, 454, 526, 152/527, 540, 542–543, 544, 546, 547, 548, 554–556, 379.3–379.5, 381.3, 381.4, 536, 531, 539, 550, 549, 553, 555, 557

[56] References Cited

U.S. PATENT DOCUMENTS

| | | |
|---|---|---|
| 3,994,329 | 11/1976 | Masson et al. |
| 4,067,374 | 1/1978 | Alden et al. |
| 4,287,924 | 9/1981 | Deck et al. |
| 4,554,960 | 11/1985 | Pompier |
| 4,779,658 | 10/1988 | Kawabata et al. |
| 4,917,164 | 4/1990 | Ushikubo et al. |
| 5,217,549 | 6/1993 | Johnson |
| 5,263,526 | 11/1993 | Oare et al. ........... 152/540 |
| 5,368,082 | 11/1994 | Oare et al. ........... 152/517 |

FOREIGN PATENT DOCUMENTS

| | | |
|---|---|---|
| 1502689 | 10/1967 | France |
| 2469297 | 5/1981 | France |
| 3-143710 | 6/1991 | Japan |

Primary Examiner—Adrienne Johnstone
Attorney, Agent, or Firm—Robert R. Reed; Alan A. Csontos

[57] ABSTRACT

The weight, space and convenience advantages of a run-flat tire can be substantial. This is especially true for the urban-economy car or family type vehicles which have limited space available for a spare tire and inadequate space for the removed flat tire. These vehicles also have higher comfort requirements that must be addressed. The mini-spare solution to the flat tire problem has very limited performance capabilities. Other solutions include major modifications in the rim and/or the tire, which are not cost effective or compatible with a conversion to standard tires on the same rims.

The run-flat tire of this invention includes thickened sidewall portions, a belt package with a cap ply, lower sidewall rubber support portions, a specially designed bead seat area with a rim seat ply and three carcass layers. The classical problems of inflated vs. deflated performance tradeoffs in ride comfort, handling, radial stiffness and endurance of the tire are substantially improved. This is accomplished with a run-flat tire having relatively small weight increases over a standard tire and a rim that can be used interchangeably with the standard tire.

The run-flat tire system of this invention is capable of maximum lateral accelerations under nominal operations of approximately 0.90 $g^S$ and extended operating efficiency (i.e., handling and durability) at higher speeds for longer distances.

21 Claims, 5 Drawing Sheets

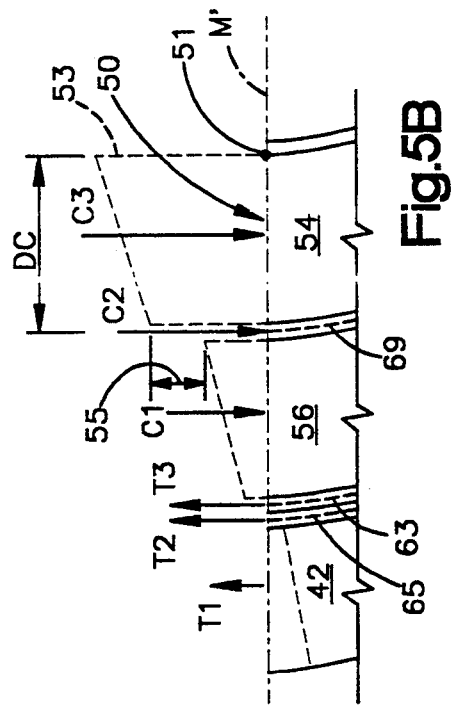
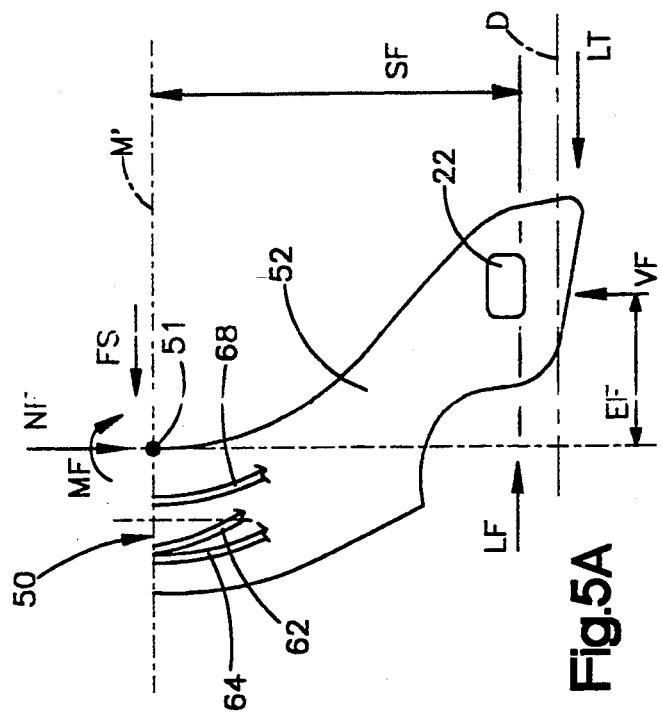
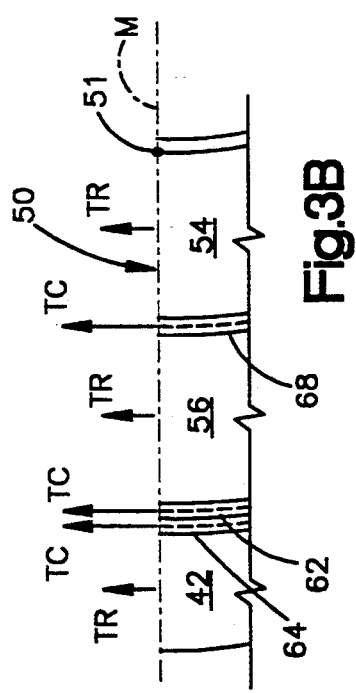
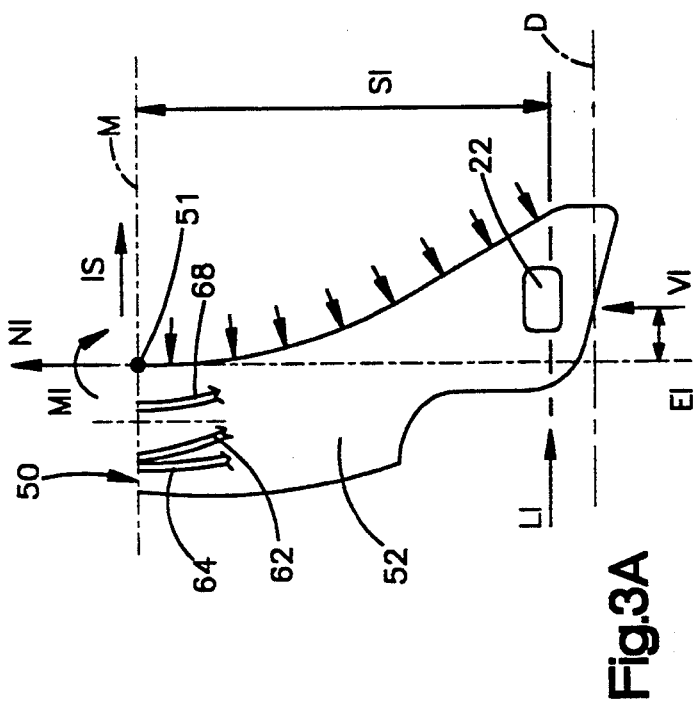

RUN-FLAT TIRE WITH THREE CARCASS LAYERS

BACKGROUND OF THE INVENTION

1. Field of the Invention

This invention relates to a radial pneumatic tire and more specifically to an improved self-supporting run-flat tire.

2. Description of the Prior Art

There is a current ongoing effort by automobile manufacturers to eliminate the spare tire in order to reduce vehicle curb weight, increase available space within the vehicle and provide operator convenience. This is particularly true for vehicles having higher comfort specifications such as conventional luxury, family or urban-economy type vehicles. For example, new generation electrical and hybrid type vehicles have critical space and weight restrictions.

One solution to increase trunk space and reduce weight of the spare tire is the mini-spare. This tire is a specifically designed and constructed narrow tire mounted on a special rim. The tire has a slightly smaller diameter than the standard factory equipment tire. These tires are very limited in the number of travel miles permitted and the speed of the vehicle. They are intended to get the vehicle to a service station so the standard tire can be repaired. Special mini-spare standards are provided by the Tire and Rim Association (T&RA) of Copley, Ohio and are based on vehicular weight and performance. The mini-spare is not the best solution because the tire loses air over time (by permeation) and will not have the performance characteristics of a properly inflated mini-spare. Furthermore, space for the removed flat tire is frequently not available.

Another recent solution is the run-flat tire. The advantage of this tire is to eliminate the need of a spare tire and ancillary equipment, achieving substantial savings in vehicle weight and increasing the space for other automotive systems and cargo. Numerous variations of run-flat tires have been developed. These involve changes to the structure of the tire itself and modifications to the rim to hold and support the flat tire. Each variation is limited by safety restrictions on vehicle speed, length of travel, zero inflation pressure handling and the magnitude of the lateral accelerations that force the bead of the tire off the rim seat. Further, the best solutions are those which do not affect the vehicle's nominal performance. Therefore, the need for improvements in the design of run-flat tires continues.

A number of generic features of run-flat tires have been disclosed which yield improvements, although limited, in vehicle performance. These features include thickened tire sidewalls, sidewall reinforcing plies, tire bead seat and vehicle rim configuration modifications, tire sidewall to rim flange contact and tire belt package edge modifications. Each of these features can be used to help solve known run-flat performance problems.

One feature of some run-flat tires is thickened sidewalls to support the vehicle after loss of inflation pressure. Such a sidewall, as the tire is viewed in cross-section, presents a crescent-shaped mass of rubber to the inside of the carcass reinforcing. On complete deflation of the tire, the crescent-shaped mass is put into compression while the carcass cord reinforcement is in tension; thereby preventing collapse of the sidewall. The respective inner wall surfaces of the tire do not contact one another and the rolling radius of the tire is maintained at a relatively large percentage of the inflated rolling radius of the tire. Seven patents that disclose a thick sidewall design are U.S. Pat. Nos. 4,067,374; 4,779,658; 5,058,646; and 5,217,549, European Patent No. 456,437 (EP), Japanese Patent No. 1-30809 (JP) and French Patent No. 2,469,297 (FR).

U.S. Pat. No. 4,067,374 discloses the use of a crescent-shaped sidewall reinforcing rubber portion inside the carcass layer which has a high dynamic modulus with low hysteresis properties and high aging properties. The crescent-shape sidewall reinforcing rubber is put into compression while the cords of the carcass are put into tension, thereby inhibiting collapse of the sidewall. A cap ply located outside the belt package cooperates with the sidewall construction to increase the run-flat performance of the tire. The patent also discloses a lower sidewall support on the tire that contacts a rim flange when the tire is in an uninflated mode.

In European Patent No. 458,437, the inner sidewalls of the tire have a crescent-shaped reinforcing rubber with a specified radius of curvature of the axially inner face in relation to the section height of the tire. Two radial carcass plies are turned up around the bead cores from the inside to the outside. Two cap plies are positioned radially outward of two belt plies. In addition, this run-flat tire design includes an extension of the bead area to form a bead toe for a bead retaining system.

The crescent-shaped reinforcement rubber portion of the run-flat tire in U.S. Pat. No. 4,779,658 has two layers; i.e., an anticrack layer adjacent to the carcass and a reinforcing layer inside the anticrack layer. The reinforcing layer provides more support for the tire when deflated and the anticrack layer is stated to provide a balance between ride comfort and crack resistance. This tire also has a protruding rubber bead toe portion supported by a rubber chafer and a fabric member made of textile cord.

U.S. Pat. No. 5,058,646 is similar to EP 458,437 but discloses a three-layer crescent-shaped cushion on the inner sidewall in terms of thickness of the layers. A hard rubber bead filler is further disclosed for the bead area of the tire.

The pair of crescent-shaped elastomeric reinforcing members disclosed in U.S. Pat. No. 5,217,549 are preferably for high profile tires having a section height of 5 inches (127 millimeters) or greater. Sidewall stiffness is achieved by a single high modulus crescent-shaped member in each sidewall with a reinforcing bias ply strip on the inside or the outside surface of the two carcass plies. These bias ply strips are bias at 60 degrees and reinforcing members are of a nylon material.

In the JP 1-30809 patent a crescent-shaped low heat generating rubber with a specified maximum thickness of 1.0 to 1.5 times the sidewall rubber plus the carcass thickness is arranged inside the sidewall. The crescent-shaped run-flat strip extends radially inward and overlaps the apex of the bead filler rubber by 10 millimeters or more.

A two part crescent-shaped sidewall reinforcing ply of FR 2,469,297 has a relatively thick mass. The exterior portion adjacent the carcass plies is of a flexible cellular structure having a relatively low density and Shore A hardness. Preferably the neutral axis of the sidewall during bending is located in the interior portion of the reinforcing ply.

A critical and limiting feature of the run-flat tire is the ability of the deflated tire to stay on the rim during cornering maneuvers of the vehicle. This is known in the art as resistance to bead-unseating or bead retention. Bead unseating resistance is improved by extending or recessing the toe portion of the bead area to engage a rim having an extended or recessed portion. This feature of run-flat tires is noted in European Patent 456,437 (EP), U.S. Pat. Nos. 4,554,960; 4,779,658; and 4,917,164 and Japanese Patent No. 2-179513 (JP).

In patent EP 456,437, each bead area has a relatively thin rubber portion shaped axially inward of the carcass to form a bead toe. The toe extends radially inward to be inserted into a rim groove at the axially inner end of a tapered bead seat of a wheel rim. The base of the bead of the tire is further provided with a groove immediately axially outside the bead toe and inside a bead core. The groove fits into a hump formed in the bead seat of the rim for which the tire is designed.

U.S. Pat. No. 4,779,658 also shows a protruding rubber member which serves to reinforce the bead area to prevent the bead from unseating during run-flat travel. The protruding rubber seats the tire to a rim which is modified to receive the protruding rubber member. U.S. Pat. No. 5,058,646 discloses a similar protruding member that seats in a modified rim.

The extended rubber toe portion of each bead area disclosed in U.S. Pat. No. 4,917,164 is a hard rubber member bonded to the crescent-shaped reinforcing layer. The toe portion has a preferred elastic modulus at 100 percent unit strain of 75 to 95 kilograms per square centimeter. A fabric reinforcing member or ply is attached to the exterior of the toe portion as an interface to the rim seat. Another rubber member is bonded to the heel portion at the rim interface. All these components help to maintain the tire on the rim after it becomes deflated.

The problem of maintaining the tire on the rim with a loss in inflation pressure is also discussed in U.S. Pat. No. 4,554,960. To resist bead-unseating, this patent discloses a specially designed bead area base and precise placing of the beads on the rim seats. A rim hump is formed on a standard rim with a circumferential hump having radially a cylindrical generatrix. Japanese Patent No. 2-179513 also discloses the modification of the bead toe portion as well as the rim seat.

With the extensive flexing of the run-flat tire and the large deflections associated with the deflated rolling tire, the various components within the run-flat tire undergo gradual breakdown. High component temperatures also contribute to the breakdown of the materials in the run-flat tire.

Efforts to give the crescent-shaped sidewall supporting members additional performance improvements are disclosed in U.S. Pat. Nos. 3,994,329 and 4,287,924, Japanese Patent No. 3-14370 (JP) and French Patent Nos. 1,502,689 and 2,458,407. Improvements include better heat conduction from the thickened sidewall portions, limited flexing or sagging of the deflated tire and reductions in the required thickness of the crescent-shaped reinforcement.

The chambers of the tire disclosed in U.S. Pat. No. 3,994,329 are lenticular in shape. These chambers are filled with a flexible cellular material and are bounded on both lateral sides by reinforcing layers, such as plies of the carcass. These layers form walls that render the sidewalls suitable to support the load of a wheel with limited sagging of the tire.

In U.S. Pat. No. 4,287,924 a two part crescent-shaped member has a heat conducting sheet or layer between the two parts. The layer extends over the whole height of the crescent-shaped portions and the two crescent-shaped parts are of different flexibility. The heat conducting layer may have parallel metallic cords extending radially to assist in the heat conductivity. The height of the tire is 31 percent of its inflated height when the inflation pressure is zero.

The cord reinforcing unit on the interior surface of the sidewall crescent-shaped reinforcing member in JP 3-143710 consists of at least one reinforced ply. The crescent member and the reinforced ply provides the overall sidewall support for run-flat performance. Also, the bead area has a rubber toe portion that fits into a rim recess for bead seat retention.

The FR 1,502,689 patent discloses a very thin crescent-shaped member at the interior of the sidewall which is heavily reinforced by one or two plies having reinforcing members. These reinforcing members are at an angle of ±30 degrees with the radial plane to help support the sidewall by triangulation with the radial reinforcing members of the carcass in the sidewall. This tire is designed for resistance of the sidewall to punctures.

A portion of the crescent-shaped reinforcing member in FR 2,458,407 is positioned inside the innerliner rubber (FIG. 3). This interior portion has some load bearing abilities, but also becomes an interior sealant material. The total thickness of the sidewall portion at an median plane of the tire is expressed as a function of the load on the tire, the section width of the tire and the radial distance from the axis of rotation to the median plane.

The features discussed above can be used in the design of a run-flat tire having some run-flat endurance capability. However, even combining all of such features will provide a run-flat tire with only limited performance capabilities. There remains a need to have improved tire performance to permit additional travel distances and especially to achieve improved load supporting capabilities for the vehicles using higher aspect ratio tires. Problems continue to inhibit run-flat tire performance when vehicle ride comfort of the inflated tire is considered. The need is to add features to create a run-flat tire which has little or no influence on the vehicle during inflated tire running but which have a significant influence after loss of tire inflation pressure, particularly in improvements to the load supporting and cornering comfort capabilities of the vehicle.

The addition of sidewall components, such as harder rubber bead fillers and reinforcing plies have been disclosed in standard T&RA tires to improve handling. However, these components in a tire degrade the ride comfort or other performance characteristics of the inflated tire.

There is a need for a new run-flat tire having improved performance characteristics that overcome some of the limitations discussed in the art. A run-flat tire that has less deflection when deflated allows the trip to continue and permits the continuation of almost normal operation of the vehicle. This is a particular need for a luxury car, family or urban-economy vehicle and the like. A durable run-flat tire is also needed that has an acceptable response to steering inputs at zero inflation pressure yet capable of adequate inflated ride comfort with a relatively soft vehicle suspension system. Furthermore, vehicles of the family or urban-economy type have available space problems as a result of their overall dimensions and the relatively large size of the passenger and luggage spaces.

SUMMARY OF THE INVENTION

Space, weight and convenience problems associated with spare tires are solved by a run-flat tire. An object of this invention is to provide a run-flat tire which demonstrates improved vehicle performance under deflated conditions and yet achieves the same vehicle performance as a standard tire when inflated.

A further object of this invention is to provide a run-flat tire which can be constructed by conventional manufacturing techniques, requiring few additional manufacturing steps and procedures, thereby having a cost effective tire which will achieve the required long travel distances at relatively high speeds and with minimum changes in vehicular steering feel.

A still further object is to prevent premature stress cracking from being produced during run-flat travel in or near the boundaries between the crescent-shaped reinforcing members and the reinforced carcass layers in the load bearing sidewall portions of the run-flat tire.

In particular, the run-flat tire of this invention introduces an essential third inner carcass layer that preferably extends from bead to bead and bisects two crescent-shaped reinforcing members in each sidewall. Other bead portion and belt package features and components are disclosed that are a part of the total combination that yields improved run-flat tire performance. This run-flat tire improves deflated tire running and yet maintains good ride comfort and handling during inflated tire running. This higher profile run-flat tire is particularly useful on luxury, family and urban-economy type cars. Tires for these vehicles have aspect ratios in the range of 40 to 65 percent. Aspect ratio is defined as the tire section height as a percent of the overall tire width.

The preferred embodiment tire of this invention is easily mounted on a standard rim of a vehicle and is capable of sustaining vehicle loads at the tire's contact patch with the loss of inflation pressure. The tire has a crown portion with a tread. A belt package is located radially inward of the tread. An innerliner portion covers the interior surface of the tire. There are a pair of bead portions each having a bead core and a bead filler.

A pair of load bearing sidewall portions are each disposed radially between a respective lateral edge of a crown portion of the tire and a respective bead portion. Each sidewall portion has first and second crescent-shaped reinforcing members disposed outside the innerliner portion.

A middle carcass layer radially inward of the belt package extends between each bead has its end portions turned up from inside to outside around each bead core in such a manner to at least partially encompass the bead core and a respective bead filler. An outer carcass layer is disposed outside the middle carcass layer and the turned-up portion and extends radially inward to at least a point axially exterior and adjacent to each bead core.

An inner carcass layer is disposed inside of the middle carcass layer and is positioned between the first and second crescent-shaped members in each sidewall portion. The inner carcass layer extends radially inward to at least a point axially interior and adjacent to each bead core. The carcass layers each have a plurality of substantially parallel reinforcing members and a curvilinear configuration.

In one embodiment of the invention at least a pair of carcass-shaped reinforcing members can be separated by any interface portion that achieves the objects of this invention by its position within the sidewall portions. The position of the interface portion (i.e. inner carcass layer) between at least two crescent-shaped reinforcing members provides a radial stepwise stress distribution between the two crescent-shaped reinforcing members axially across the interface portion on a median plane adjacent a central radial plane of a contact patch. The position of the interface portion also reduces the maximum deflection of the deflated tire due to vehicle loads. Three total carcass layers, with the inner carcass layer providing the interface portion, are preferred to provide extra reinforcement for the severe operating conditions during abnormal deflated running, such as curb impact, high temperatures or extreme deformations.

In an embodiment of this invention a belt package is located radially outward from a crown portion of the outer carcass layer. In this embodiment, a first belt of the belt package is located radially outward of the crown portion of the carcass layers. At least one other belt is located radially outward of the first belt. The first belt is wider than the other belts. A cap ply is located outward of the other belts and inward of a tread portion. The cap ply is wider than both the first and other belts. The tread portion is located radially outward of the belt package for contacting a ground surface.

In a further embodiment of this invention, a rim seat ply contacts the rim at each tire/rim interface and has a square woven fabric as reinforcing members. A rubber seat portion is positioned to support the rim seat ply at each bead portion. A second rubber toe portion is located axially and radially inward of the bead core. The toe portion also supports the rim seat ply and helps keep the tire on the rim at a tire/rim interface. Finally, a pair of rubber support portions are disposed to assist the rim seat ply in contacting a flange of the rim at the tire/rim interface when the tire is deflated.

Another embodiment includes a tire and rim system capable of sustaining vehicle loads effectively with the loss of inflation pressure. The tire and rim system includes the preferred run-flat tire including the rim seat ply, the first rubber seat portion and the second rubber toe portion which is mounted on a rim having a hump disposed at the axially innermost end of the rim seat ply of the tire. The rim seat ply may engage the rim hump so that the tire remains seated on the rim during vehicle maneuvers as well as during straight ahead running.

BRIEF DESCRIPTION OF THE DRAWINGS

The foregoing and other objects and features of the present invention will be more clearly understood and apparent to those skilled in the art to which the present invention relates from reading the following description and specifications thereof and when incorporated with the accompanying drawings in which:

FIG. 3A is an elevation view of a radial section of one of the lower sidewall and bead portions of the run-flat tire below a median plane for a mounted, loaded and inflated tire;

FIG. 3B is an enlarged view of the upper extent of the tire portions shown in FIG. 3A and schematically showing the radial load distribution on the median plane of the tire;

FIG. 5A is an elevation view of a radial section of one of the lower sidewall and bead portions of the run-flat tire below a median plane for a mounted, loaded and deflated tire;

FIG. 5B is an enlarged view of the upper extent of the tire portions shown in FIG. 5A and schematically showing the radial load distribution on the median plane of the tire;

DETAILED DESCRIPTION OF THE INVENTION AND ITS PREFERRED EMBODIMENTS

The unique features of the run-flat tire of this invention, which yield the improvements needed for a vehicle to overcome the above described limitations of state-of-the-art tires, include the load bearing sidewall portions each having first and second crescent-shaped reinforcing members bisected by an essential third inner carcass layer. Each of the essential three reinforced carcass layers extend from the bead to at least a crown point below the belt package, and preferably extend the full width and depth of the tire from bead to bead. The bias of the carcass reinforcing members from a radial plane is determined by the vehicle application. The run-flat tire is a radial tire having carcass reinforcing bias angles from about 75 degrees to 90 degrees. Other structural features in combination with the unique sidewall portions include a belt package with at least two belt plies and a cap ply as well as a pair of bead portions each including a relatively high modulus bead core, a bead filler, a rubber support portion, a rubber seat portion, a rubber toe portion and a rim seat ply at the tire/-rim interface that may engage a hump on a rim of the vehicle.

Figure 1:
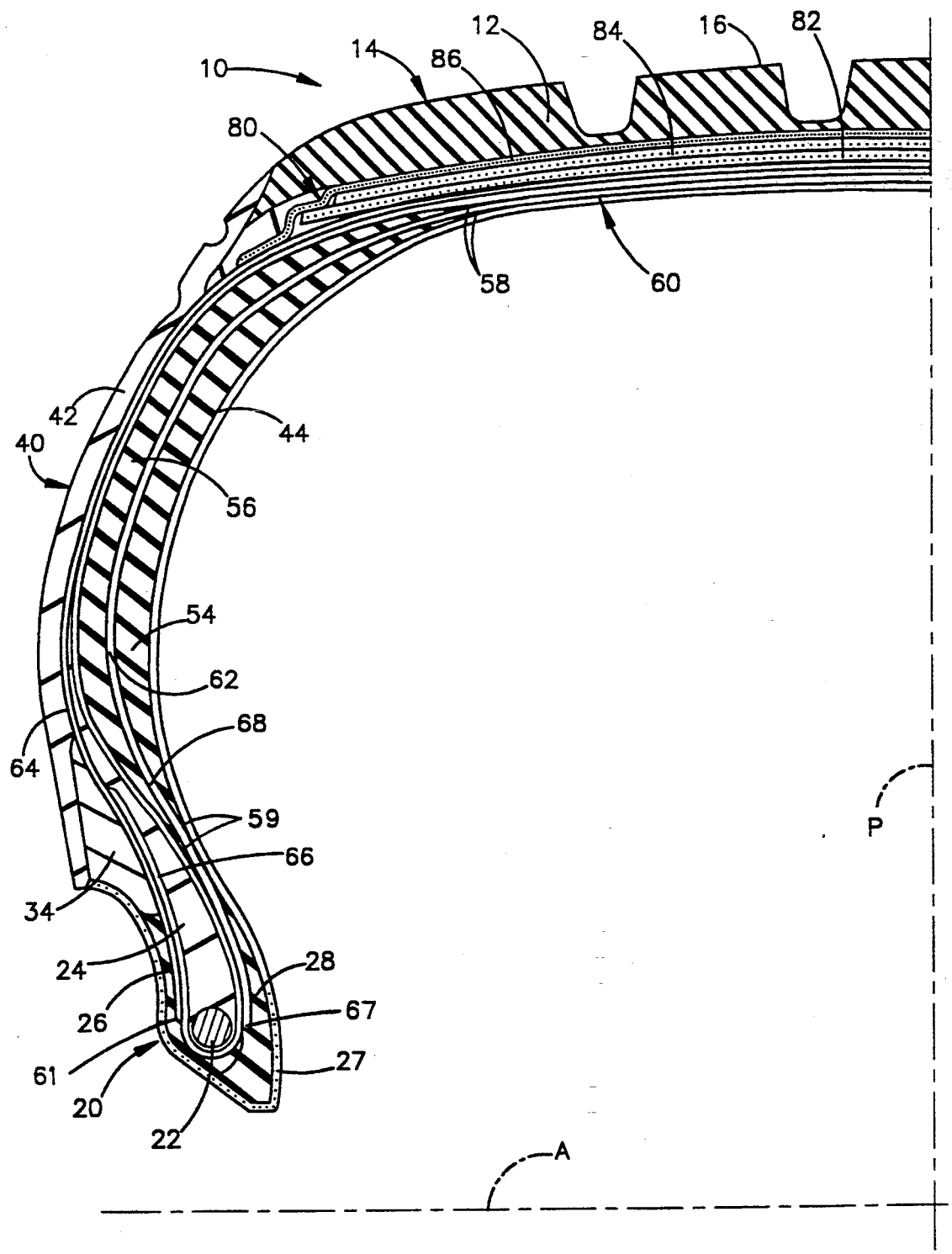
FIG. 1 is a partial cross-sectional view of the cured run-flat tire according to the invention, taken along a radial plane passing through the axis of rotation.

The run-flat tire 10 of this invention has a cross-sectional configuration in a radial plane containing an axis of rotation A of the tire as illustrated in FIG. 1. This figure shows half the cross-section which is symmetrical about the midcircumferential plane P. The tire having this cross-sectional configuration is readily mounted on a rim of a vehicle.

Figure 2:
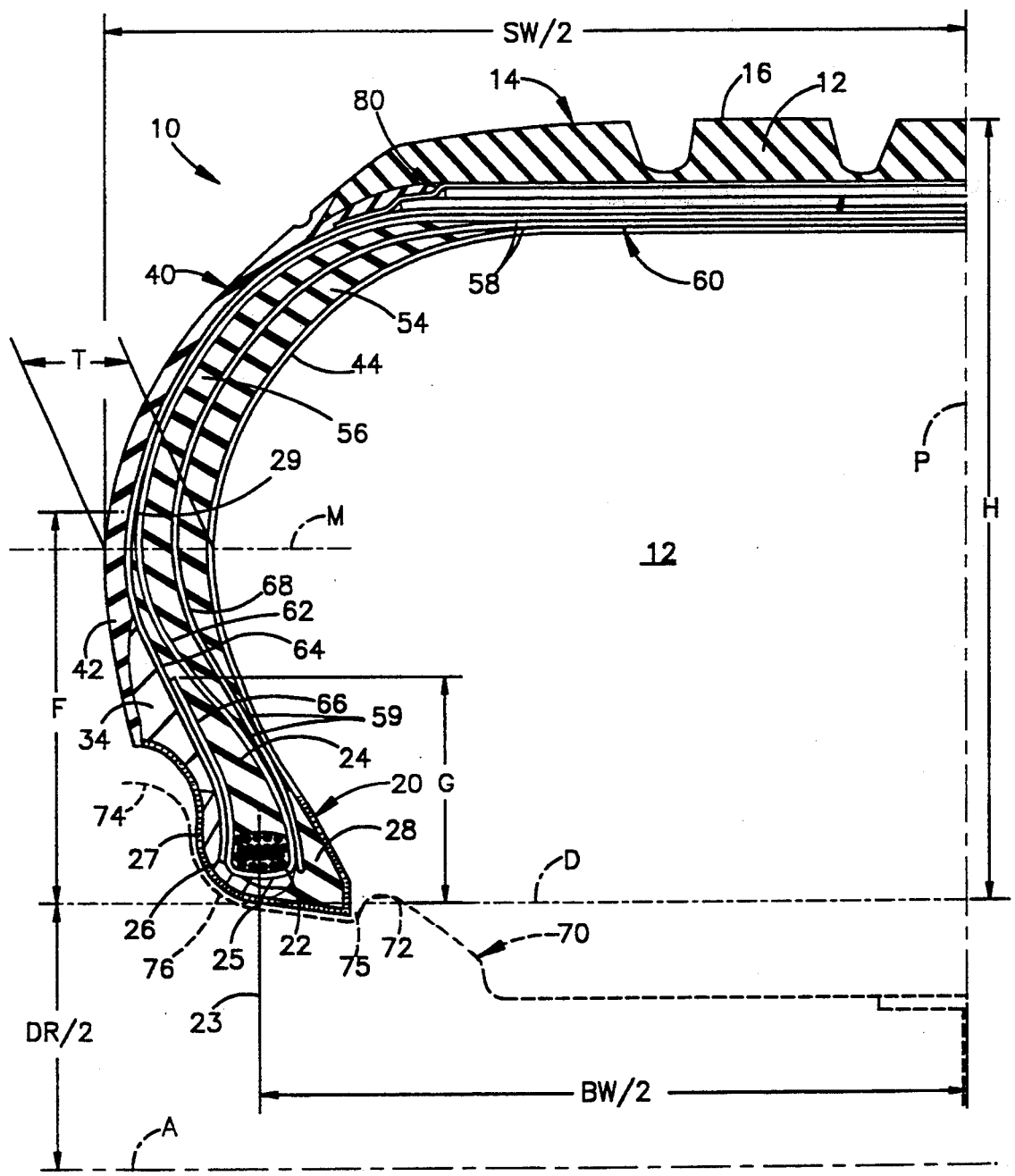
FIG. 2 is a partial cross-sectional view of the run-flat tire inflated and mounted on a rim.

A pair of bead portions 20 are axially spaced apart and each include a bead core 22, a bead filler 24, a rubber support portion 34, a first rubber seat portion 26, a second rubber toe portion 28 and a rim seat ply 27. A carcass portion 60 has an middle carcass layer 62, an outer carcass layer 64 and an inner carcass layer 68. The middle carcass layer 62 has a turned-up portion 66 which extends around the bead core 22 from inside to outside of the tire 10 to a distance G radially outside the bead reference D, as illustrated in FIG. 2. The distance G is in a range of 15 to 40 percent, and preferably equal to about 30 percent, of the section height H. The bead reference D is established by a line parallel to the axis of rotation A from the intersection of a radial line 23 from the center of the bead core 22 and the innermost surface of the rim seat ply 27 at point 25. The inner carcass layer 68 is positioned uniformly between the middle carcass layer 62 and the innerliner portion 44 in each bead portion 20 and extends radially inward to at least a point 67 axially inward and adjacent to the bead core 22. The outer carcass layer 64 of the tire is located axially outside the middle carcass layer 68 and the turned-up portion 66 and extends radially inward to at least a point 61 axially outward and adjacent to the bead core 22. The bead filler 24 contacts the outermost surface of the bead core 22 and extends a distance F radially outward of the bead reference D. The bead filler 24 is contoured to assume a predetermined optimum profile. An apex 29 of the bead filler 24 is preferably at the distance F in a range of 40 to 60 percent, and preferably about 50 percent, of the section height H.

A load bearing sidewall portion 40 extends from a belt package 80 of the tire to the bead portion 20 at both axial edges of a crown portion 14. Each sidewall portion 40 includes a pair of crescent-shaped rubber reinforcing members 54,56 as shown in FIGS. 1 and 2. The profile shape of the crescent-shaped reinforcing members may also be lenticular within the scope of this invention. The first crescent-shaped reinforcing member 56 is disposed between the middle carcass layer 62 and the inner carcass layer 68. The second crescent-shaped member 54 is disposed between the inner carcass layer 68 and an innerliner portion 44 of the tire 10. The sidewall portions 40 help maintain the crown portion 14 radially separated from the bead portion 20 when the tire has a loss of inflation pressure. A tread rubber portion 12 has a surface 16 for contacting a ground surface during running of the tire.

The rubber in the tread rubber portion 12 and a sidewall rubber portion 42 may be of any suitable compound based on natural or synthetic rubber or any suitable combination thereof known in the art. The innerliner portion 44 is preferably of a halobutyl rubber.

The overall profile of the sidewall portions 40 are shaped in a manner to provide the best equilibrium curve for generating normal and lateral forces on the tire during inflated running. A thickness of the load bearing sidewall portion including a sidewall rubber 42, the inner, middle and outer carcass layers 68, 62, 64, the first and second crescent-shaped reinforcing members 56, 54, the bead filler portion 24 and the innerliner portion 44 is approximately constant over its radial extend and such sidewall portion 40 has a width of about 6 percent to about 8 percent of a section width SW of the tire 10. The crescent-shaped members 54,56 have a profile geometry including a thickness distribution to produce optimum inflated and deflated tire performance. The crescent-shaped members extend to a crown point 58 in the crown area of the tire axially inward of the axial extent of the belt package 80 at least 20 millimeters. A preferred thickness distribution of the crescent-shaped members is that second member 54 has a thickness substantially equal to that of first member 56. The properties of these crescent-shaped members are discussed later.

The belt package 80 is located radially outward of the carcass layers 62, 64 and 68 in the crown portion 14 of the tire 10. In an embodiment of this invention, the belt package has a wide inner belt 82 and at least one narrower outer belt 84 (FIG. 1). A cap ply 86 having a width to axially extend beyond both lateral edges of the innermost belt 82, is included as part of the preferred belt package 80. These belt components allow the lateral areas of the crown portion 14 to be more compliant in compression, which improves the endurance of the tire when running deflated. This results in a redistribution of the load so that the tread portion 12 at its two shoulder regions can fully support the loads from the sidewall portions 40. Reinforcing members of the inner belt 82 are preferably of an metallic (i.e. steel) material. Reinforcing members in each of the outer belts 84 are also preferably of a aromatic polyamide or a metallic (i.e., steel) material. Belt reinforcing members are at an acute angle with respect to the midcircumferential plane P. The cap ply 86 has reinforcing members preferably of a polyamide multi-filament (i.e., nylon) material which are approximately parallel to the midcircumferential plane. Other belt package and cap ply materials that maintain structural integrity of the tire may be used for the reinforcing members within the scope of this invention.

The overall section height H is measured from the bead reference D (FIG. 2). The overall section width SW is measured in the maximum width median plane M. The ratio of the section height H to the overall section width SW is the aspect ratio of the tire. Aspect ratios between approximately 0.40 to 0.65 are preferred values for the cured run-flat tire of this invention (FIG. 1).

The run-flat tire 10 is mounted on a rim 70 as illustrated in FIG. 2. The rim 70 can be a standard T&RA rim but preferably has a hump 72 added to help retain the bead portion 20 of the tire on the rim 70. The nominal rim diameter DR is measured to a rim reference D which is associated with the size of the tire. The reinforced rim seat ply 27 contacts the rim at the tire/rim interface 76. The contour of the rubber seat 26 has been designed to obtain a more uniform pressure distribution at the tire/rim interface 76. The increase of frictional forces between the tire rim seat ply 27 and the rim 70 at the tire/rim interface 76 helps maintain the tire 10 seated on the rim 70. The rim seat ply 27 also contacts the hump 72 near a base point 75. The design of rubber seat and toe portions is disclosed in U.S. Pat. No. 4,554,960, which is incorporated herein by reference thereto. The rim seat ply 27 has essentially square woven fabric reinforcing members at ±45 degrees with the radial plane and extends circumferentially around the tire. Square woven fabric standard in the industry can be used. The rim seat ply reinforcing members are preferably of a textile material (i.e. aromatic polyamide, polyester, rayon or nylon).

The symmetric hump 72 on the rim 70 is referred to as an "SH contour" rim. The diameter to the outermost surface of the hump 72 is at least the same radial extent as the bead reference D. This profile provides additional axial support to keep the bead portions 20 from being unseated. The run-flat tire 10, as well as a standard T&RA tire, is easy to mount and dismount on this rim 70.

A gap between a flange 74 of the rim 70 and the tire 10, as observed in FIG. 1, is provided to prevent contact between the inflated tire 10 and the rim 70. Contact between the inflated tire and the rim in this region when the vehicle is cornering will affect the handling characteristics of the vehicle. The gap is maintained between the rim seat ply 27 with its rubber support portion 34 and the flange 74 of the rim 70 during inflated running conditions. A sidewall rubber 42 is preferably positioned to the exterior of the each support portion 34 and is spaced from the flange 74 by the same gap.

Figure 4:
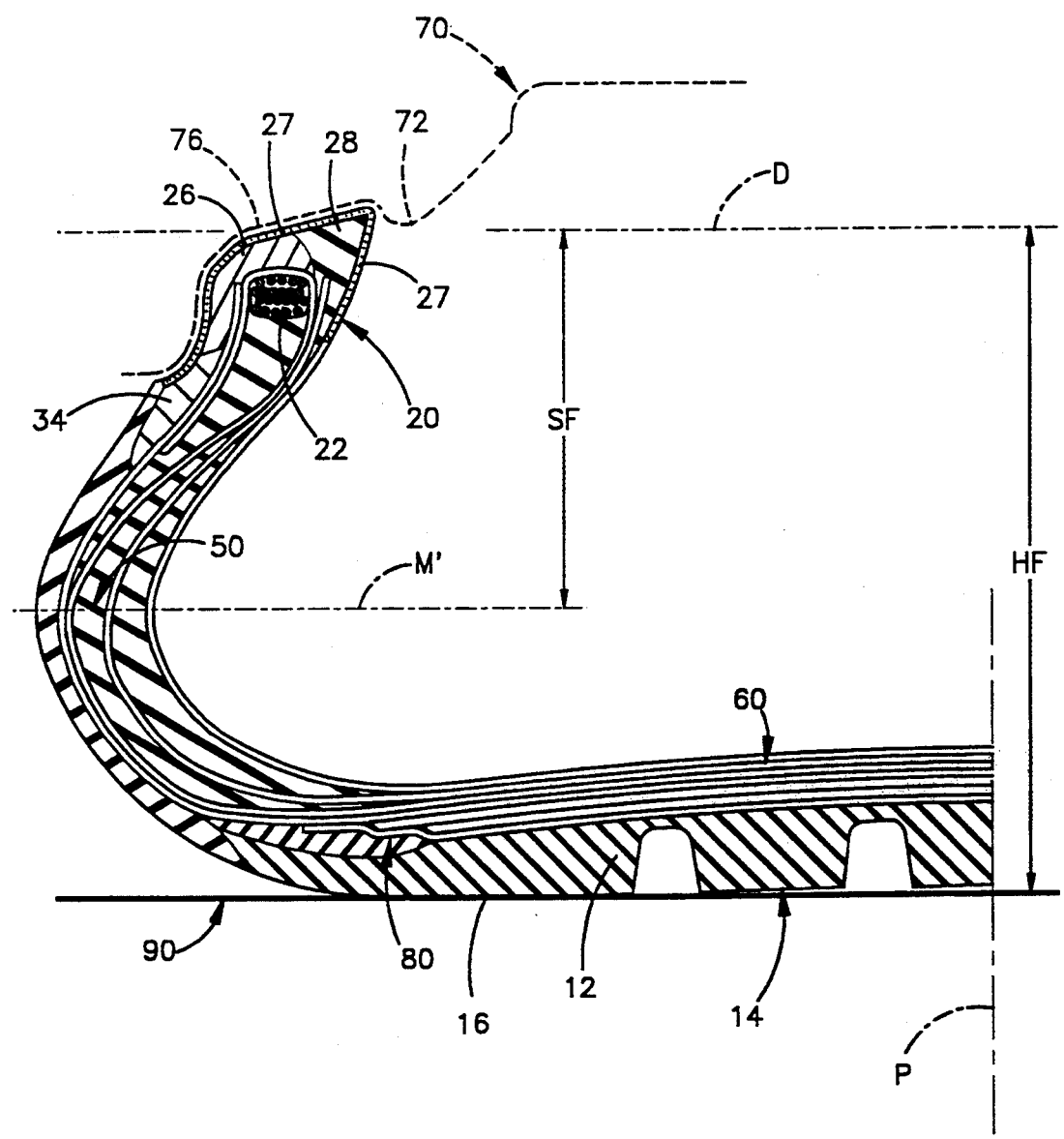
FIG. 4 is a partial cross-sectional view of the mounted, deflated and loaded run-flat tire according to the invention in contact with a ground surface.

A loaded and deflated run-flat tire 10 in contact with a ground surface 90 is illustrated in FIG. 4. The crown portion 14 of the tire 10 has a tread 12 with a tread design or sculpture wherein surface areas 16 make contact with the ground surface 90. The radial section height H of the free tire 10 (FIG. 2) is compressed to a run-flat height HF, with both heights being measured from a bead reference D. The crescent-shaped portions are under compression and bending and the rim seat ply 27, backed-up by the rubber support portion 34, is in contact with the flange 74 of the rim 70. In addition, the distance from the center of the bead core 22 to a base point 75 (FIG. 2) on the hump 72 of the rim is in a range of 12 to 16 millimeters. The carcass turn-up portions 66 of the middle carcass layer 62 now extend outward from the bead reference D a distance G (FIG. 2) in the range of 25 to 40 percent of the deflated section height SH of the tire. This configuration helps transmit the radial loads from the surface areas 16 to the rim 70 of the vehicle.

The physical properties and shape of the various portions of the tire 10 are important to increase both the lateral and radial stiffness of the deflated tire 10. For example, the rubber seat portion 26 and the rubber toe portion 28 are contoured to provide a continuous footing of the rim seat ply 27 on rim 70 at the tire/rim interface 76 (FIG. 4) for the reasons discussed above.

Preferably the tire 10 is optimized so that the forces and moments schematically shown in FIG. 3A operate to ensure equilibrium of the lower sidewall and bead portions of the mounted and inflated tire. A sufficiently small finite circumferential length of one of the lower sidewall and bead portions is considered in this analysis such that force changes on radial planar surfaces 52 have limited influence relative to the moment and forces shown in FIG. 3A and, therefore, are not illustrated. The internal inflation pressure IP produces a relatively large axial force LI at the bead to rim interface. The section face 50 at the median plane M has a resulting normal tension force NI to resist the internal pressure IP. The tension force NI resultant comprises membrane tension forces TC in the three carcass layers as well as tension forces TR in the rubber components, as illustrated in FIG. 3B. The relative magnitude of these tension forces can vary from one component to another within the scope of this invention. The moment MI from the forces on surface 50 at the median plane M about a moment axis perpendicular to the radial plane surface 52 at inner point 51 is clockwise, as shown in FIG. 3A. This is a result of the tension forces TC and TR. The resulting radial force VI at the tire/rim interface 76 is sufficient to maintain the inflated tire in substantially air tight contact with the rim, whereby the inflation pressure IP in the cavity 12 of the tire 10 does not diminish. The response to the inflation pressure IP pushing the tire 10 away from the rim 70 the tension in the bead core 22 holds the tire on the rim as a result of the cured tire's diameter being smaller than the diameter DR of the relatively rigid rim 70. This vertical force VI will increase in the region of the external load (tire's contact patch) for the rolling tire on the vehicle. This increased vertical force VI is insufficient to produce a resulting compression force (−NI) on the median plane surface 50 with a nominal inflation pressure IP.

With the total loss of inflation pressure (i.e. IP=0) the force distribution on the lower sidewall and bead segment changes dramatically, as illustrated in FIG. 5A. The membrane tension is lost and the resultant radial force VF at the tire/rim interface 76 increases from the value of the radial force VI, which exists in a fully inflated tire situation as illustrated in FIGS. 3A and 3B, to a value equal to essentially half of a symmetrical load supported by the tire. The axial force LF is reduced from the fully inflated tire axial load LI due to the now substantially nonexistent need to react any axial component of the inflation pressure inside the tire. The section face 50 at the median plane M' moves axially outward and radially inward as the tire deforms to a section height HF (FIG. 4). The eccentricity EF of the radial force VF is the axial distance to the inner point 51 on the section face 50. This distance is larger than an eccentricity EI for the mounted and inflated tire of FIG. 3A. The efficiency or effectiveness of the run-flat tire at zero inflation pressure can be quantified by the magnitude of the change in eccentricity from EI to EF. That is, the smaller the change in eccentricity (EF−EI) the more effective the run-flat tire design. Alternately stated, the more efficient run-flat tire will support a larger radial force VF at the same change in eccentricity EF−EI than a less efficient run-flat tire. The run-flat tire of this invention is designed to be relatively efficient. Forces LF, VF, and the toe force LT are reacted at the section face 50 at the median plane M'. The toe force LT helps hold the bead area 20 in contact with the rim 70 and will be discussed in more detail later in this disclosure. The greater the radial force VF and its eccentricity EF plus the axial force LF and its radial moment arm SF the greater the moment around the moment axis at the inner point 51 on the section face 50 of the median plane M'. The loads on the section face 50 produce a resulting force NF and a moment MF to resist the loads and the moments caused by loads at the tire/rim interface 76, as well as inertial forces by the rotating tire.

The distribution of loads on the section face 50 of the median plane M', as illustrated in FIG. 5B, are essential in support of the vehicle by the deflated tire 10 of FIG. 4. The reinforced sidewall support members 54, 56 are used in the tire to support the vehicle loads by compressive forces. In accordance with the present invention, the run-flat tire has an additional ply positioned to assist the crescent-shaped members 54, 56 in support of these compressive loads. This ply is preferably in the form of a reinforced inner carcass layer 68. The resultant compressive force C1 acting on the first crescent-shaped member 56 and the resultant compressive force C3 acting on the second crescent-shaped member 54 are schematically illustrated in FIG. 5B. Although the schematic representations of the compressive forces C1 and C3 are not intended to represent any particular absolute values of the forces, the schematic representations are provided to illustrate the relatively greater value or magnitude of the compressive force C3 on the second crescent-shaped member 54 as compared to the compressive force C1 on the first crescent-shaped member 56. The addition of this reinforced carcass layer has numerous advantages as follows:

(1) the compressive forces C1 and C3 of the first and second crescent shaped members 56 and 54, respectively, can be reduced by the compressive force C2 on the inner carcass layer 68;

(2) a stepwise reduction 55 in the compressive stress distribution 53 from the compressive force C3 is made possible by the compressive load C2 on the inner carcass layer 68;

(3) the magnitude of radial shear forces at the interfaces between the crescent-shaped members 54, 56 and carcass layers 62, 64 and 68 are reduced to provide improved endurance of the run-flat tire of this invention; and (4) it restrains the counter deflection magnitude and, therefore, the deradialization of all carcass reinforcing members at the leading and trailing edges of the contact patch.

The compressive stress distribution 53 can vary from the linear distribution illustrated in FIG. 5B, but a stepwise reduction 55 will continue to exist in the tire of this invention.

The position of the inner carcass layer 68 from the moment axis at inner point 51 in FIG. 5B is defined by the distance DC. This distance can be selected to provide the proper advantages or improvements in the run-flat tire's ability to support itself. The axial distance DC to the inner carcass layer 68 from the moment axis at inner point 51 on the median plane M' can be optimized. Other planes through the tire sidewall portion can also be selected and the position of the inner carcass layer determined. The selection of the distance DC at the median plane M' is optimized based on the following:

1) the carcass reinforcing members 69 of the inner carcass layer 68 are able to develop their full compression capability;

2) the absolute sum of tension forces T1+T2+T3 and compression forces C1+C2+C3 are equal to the total compression force NF on the cross-section 50; and 3) the sum of the counterclockwise moments from compression forces C1–C3 and the clockwise moments from the tensile forces T1–T3 must equal the resisting moment MF which is clockwise and approximately equal in magnitude to the moment from forces at the tire/rim interface 76.

An increase in the axial distance DC adversely affects the resisting moment MF, and a decrease in the axial distance DC to near zero (inner carcass layer near the innerliner) can cause the carcass reinforcing members 69 to be subjected to buckling due to the increased compression forces exerted thereon. The axial distance DC for most run-flat tires 10 resulted in an optimum location such that approximately equal thicknesses of the first crescent-shaped reinforcing member 56 and second crescent-shaped reinforcing member 54 are preferred at the median plane M'.

The two crescent-shaped reinforcing members 54,56 can be formed of a substantially identical material to enhance the ease of manufacture in the tire building operation. The run-flat tire can thus be constructed with only a limited number of additional products and manufacturing procedures. By providing end positions 58,59 of the crescent-shaped reinforcing members which are displaced axially and radially from one another the performance of the run-flat tire can be further adjusted for vehicle suspension variations. The preferred tire has end positions 58,59 of the crescent-shaped members adjacent to one another as shown in FIG. 2. The result is a cost-effective run-flat tire for family and urban-economy type vehicles.

The crescent-shaped reinforcing members 54,56 can have the same material property or two different material properties. In one embodiment different materials include a soft rubber first crescent shaped member 56 adjacent to the middle carcass layer 62 to act as a cushion for the inner carcass layer 68 and a hard rubber second crescent shaped member 54. The hard rubber second crescent shaped member 54 can support the same load on a reduced cross-sectional area and thereby effectively decreases the total mass of the tire required to support the load of the vehicle. The following physical properties of the crescent-shaped reinforcing members 54,56 insure a stepwise reduction in the stress distribution and help inhibit catastrophic failures when the tire is running deflated. The soft rubber first crescent shaped member 56 has a Shore A hardness in the range of approximately 40 to 55 and preferably 50 to 52. The first crescent shaped member 56 has a modulus of elasticity in compression at a ten percent unit strain in a range of approximately 2.0 to 4.0 megaPascals (MPa) and preferable equal to about 2.3 MPa. A second crescent shaped member 54 is innermost to the inner carcass layer 68 and first crescent shaped member 56 and in contact with the outside face of the innerliner portion 44. The second crescent shaped member 54 has a Shore A hardness in the range of approximately 70 to 90 and a modulus of elasticity in compression at a ten percent unit strain in a range of approximately 7.0 to 15.0 MPa. The preferred Shore A hardness of the second crescent shaped member 54 is 75–80 and its preferred modulus of elasticity is 8 to 10 MPa. Both the first and second crescent-shaped reinforcing members exhibit a relatively low hysteresis. Based on actual performance results the preferred embodiment of this invention is with the crescent-shaped members 54,56 having essentially the same material physical properties, similar to that of the harder second crescent shaped reinforcing member 54. The presence of the inner carcass layer 68 between the first and second crescent-shaped members 54,56 provides a stepwise stress distribution 55 (FIG. 5B) between these crescent-shaped members at the inner carcass layer 68 as discussed above. This inner carcass layer 68 provides the necessary stress reduction in the first crescent-shaped reinforcing member 56 without the cost of having two different material properties for the crescent-shaped reinforcing members 54 and 56. A lower modulus of elasticity for the axially outer first crescent-shaped reinforcing member 56 of this invention is not preferred as it further reduces the ability of this crescent shaped member 56 to resist compressive loads and at the same time have a reduced mass.

Figure 6A:
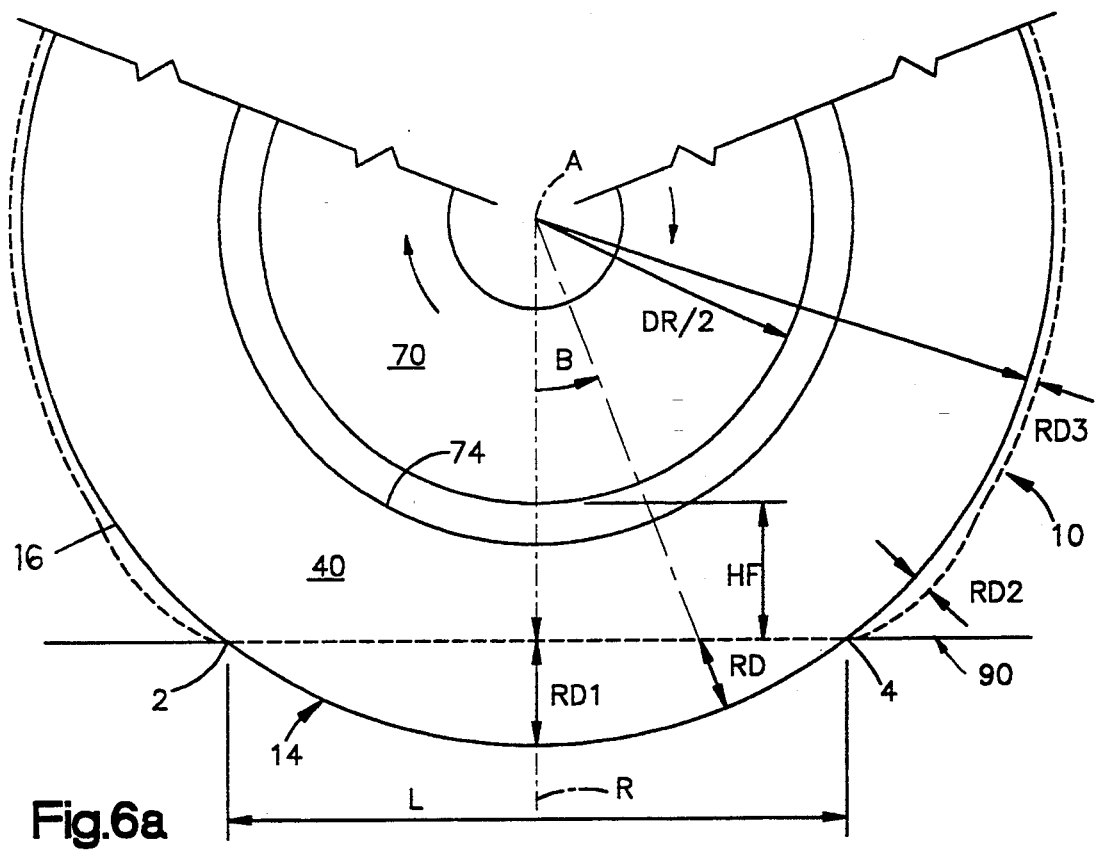
FIG. 6A is a side elevation view of a portion of the tire of this invention mounted on a rim.

During run-flat rolling of the deflated tire 10, the length L of the contact patch or footprint of the tire on the ground surface 90 is increased as illustrated in FIG. 6A. This length L can range from 2 to 5 times the footprint length of the inflated tire. In the process of the tire being deflated, there is a transfer of the essential normal load supporting portions of the tire from tension in the outer and middle carcass layers 64,62 to compression in the inner carcass layer 68 as well as the crescent-shaped reinforcing members 54,56 of the tire 10. The reinforcing members 65,63 of the outer and middle carcass layers 64,62 respectively are cords made of any suitable material from the group consisting of rayon, nylon, polyester, aromatic polyamide and polyethylene naphthalate. The large deformations of the run-flat tire 10 are illustrated in FIG. 6A by the differences between the dashed line for the loaded and deflated tire and the solid lines for the unloaded and deflated tire. Another result of this large deformation is that the section height HF of the deflated and loaded run-flat tire is approximately 40 to 60 percent of the initial cured tire section height H, for the preferred embodiment tire (FIG. 2).

Section height H is the mounted, inflated and unloaded section height of the run-flat tire 10. Section height H is in a range of approximately 96 to 98 percent of a cured section height of the tire (FIG. 1).

Another important characteristic of the deflated run-flat tire of the invention is the deradialization of the sidewall portions 40, including the crescent-shaped reinforcing members 54,56 and the three carcass layers 62,64,68 during running. At the radial plane R in FIG. 6A the deradialization is small and the tire sidewall portion 40 is under a relative maximum compression deformation.

Figure 6B:
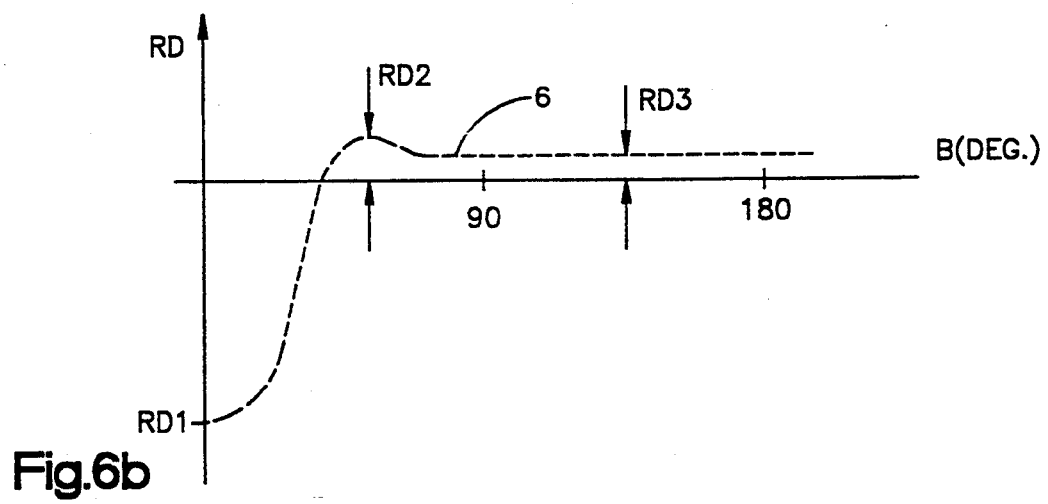
FIG. 6B is a graph of the radial displacement of the tread surface of a deflated and loaded run-flat tire as a function of circumferential position around half of the tire.

The deformation in a radial direction RD (counter deflection) as a function of the angular position B from the radial plane R is illustrated in FIG. 6B. The maximum radial deformation RD1 is at the radial plane R and decreases to zero near the edges 2 and 4 of the contact patch having a length L. Outside both contact patch edges 2,4 there is a positive counter deflection (increasing RD) of the tread surface 16 of the crown portion 14 to a maximum value RD2 of radial deformation. A major angular portion of the crown portion 14 has a small positive value RD3 of radial deformation. The radial deformation is approximately symmetrical about angular position B=180 degrees for a stationary or slow rolling tire.

The radial displacement RD verses angular position B curve 6 of FIG. 6B is useful in visualizing the forces that support the deflated run-flat tire 10. At radial plane R the inner carcass layer 68 and the crescent-shaped reinforcing members 54,56 are in compression. At the angular position of the maximum positive counter deflection (radial deformation RD2), the inner carcass layer 68 and the crescent-shaped members are in tension. Another primary function of the inner carcass layer is to limit the maximum positive counter deflection RD2 near the leading edge 4 and trailing edge 2 of the contact patch 14 (FIG. 6). The load supporting components (crescent-shaped members and inner carcass layer) cycle from tension to compression and back to tension as the tire rotates and the crown portion 14 contacts the ground surface 90. Therefore, crescent-shaped members and the inner carcass layer having both excellent tensile and excellent compression strength properties are preferred. The tension and compression physical properties of most non-reinforced rubber products used in tires are known to be approximately equal. The tensile strength properties of the inner carcass layer are much better than its compressive strength properties, due to the reduced strength of its reinforcing members in compression. Some reinforcing members are much better in compression than others. The preferred reinforcing members 69 are cords made of any suitable material from the group consisting of nylon, rayon, aromatic polyamide and polyethylene naphthalate. A hybrid reinforcing member which is more stable at higher temperatures is also within the scope of this invention. These reinforcing members 69 of the inner carcass layer 68 (FIG. 5B), being supported by the adjacent crescent-shaped reinforcing members 54,56, have an increased compressive strength as a result of this confinement. The strength (modulus of elasticity) in compression of the inner carcass layer 68 is from about 55 megaPascals (MPa) to about 95 MPa using a 1100 decitex 2 ply polyester or a 1840 decitex 2 ply rayon reinforcing material. The rubber skim layers are of a material standard in the industry. The preferred modulus of elasticity in compression for the inner carcass layer 68 is at least 75 MPa.

A critical performance characteristic of the run-flat tire 10 is the ability of the tire to achieve relatively high lateral forces without unseating from the rim 70. The essential components or features of the run-flat tire 10 of this invention, which are most helpful in achieving improved unseating performance during lateral cornering maneuvers of the vehicle included in each bead portion 20, are the rubber toe portion 28, the bead core 22, the rubber seat portion 26 and especially the rim seat ply 27. The rubber seat portion 26 has a preferred tension modulus of elasticity at 10 percent strain in a range of approximately 6.5 to 9.0 megaPascals (MPa) and the rubber toe portion has a preferred tension modulus of elasticity at 10 percent unit strain in a range of approximately 45 to 60 MPa. Other components such as the crescent-shaped reinforcing members 54,56 and the bead filler 24 are also important, but somewhat less critical, in keeping the run-flat tire on the rim. However, all of these features contribute to the run-flat performance of the tire of the invention. Even without special modifications to the rim (i.e., using standard T&RA rim specifications) the tire of this invention will remain seated up to a lateral acceleration of at least 0.60 $g^S$ with nominal vehicle operation.

FIG. 4 shows the run-flat tire 10 in a deflected position, typical of the tire in a deflated condition. This deflected position will become deformed laterally (or axially) when the vehicle is cornering. The outer side (opposite the location of the turn axis or turn center of the vehicle trajectory) is critical as the tire is being forced to the inside of the rim 70. In this maneuver, the hard rubber toe portion 28 acts in compression and helps keep the bead portion 20 from being displaced to the interior of the rim 70. In a preferred embodiment, the rim seat ply 27 engages a hump 72 at the contact point 75 on the rim 70 which acts to apply a further restraining and compressive force to the rubber toe portion 28. The hard rubber toe portion 28 resists deformation and helps maintain the bead core 22 a fixed distance removed from the hump 72. The rubber toe portion 28 has a modulus of elasticity at 10 percent unit strain in a range of approximately 45 to 60 MPa, preferably from 50 to 57 MPa.

To unseat the run-flat tire 10 from the rim 70, the bead core 22 must negotiate, or be displaced in an axial direction to a position axially inward of, the hump 72. In addition, the bead core 22 will rotate when it is displaced to a location over the hump 72 of the rim 70. Therefore, the tensile strength and torsional rigidity of the bead core 22 are important parameters in maintaining the tire on the rim 70, particularly during cornering maneuvers of the vehicle. The bead core 22 is preferably of a metallic or aromatic polyamide material. The tensile strength at one percent unit strain of the bead core is in a range of approximately 900 to 2500 Newtons per square millimeter and is preferably 2000 Newtons per square millimeter. The torsional stiffness of the bead core is the moment or torsion necessary to produce a rotation at a unit shear strain of 0.0436 radians (2.5 degrees). The torsional stiffness of the bead core of this invention is at least 90 Newton meters per radian and is preferably at least 125 Newton meters per radian for a 100 millimeter long test sample. Various bead core cross-sectional configurations are within the scope of this invention, such as circular and rectangular. The torsional moment of inertia for the cross-sectional area of the bead core is at least 125 millimeters to the fourth power and further shall be in a range of about 125 to about 350 millimeters to the fourth power, and preferably at least 140 $mm^4$. These physical parameters are defined in the American Society of Testing Materials (ASTM) of Philadelphia, Pa. Standards D885 and E6, which are incorporated herein by reference thereto.

TEST RESULTS

The run-flat tire of this invention exhibits improved vehicle performance, especially when one tire has a loss of inflation pressure. The critical ride comfort problem has also been substantially resolved by providing a run-flat tire with little change in the radial stiffness of the inflated run-flat tire. Lateral accelerations of the vehicle up to approximately 0.65 $g^S$ with an unmodified (standard) rim and up to the vehicle's lateral limit of approximately 0.85 $g^S$ with a modified rim (having a hump 72) have been achieved without the bead area 20 becoming unseated from the rim 70.

The deflated radial stiffness of various run-flat tires of the same size were obtained as shown in the first Table below. Tire A was a control tire having a construction similar to the tire of this invention, except the inner carcass ply was omitted to provide only two carcass layers. This control tire is good in ride comfort when inflated but has a relatively large deflection when loaded and deflated. The object of this invention is to produce a new run-flat tire that maintains the radial stiffness of the control tire when inflated but increases the radial stiffness above that of the control tire when deflated. Tire B is the same two carcass layer tire of tire A but has a steel reinforced run-flat stiffener ply between the carcass turned-up portion and the bead filler. Tire C is a run-flat tire having three carcass layers as described in this invention.

| TIRE | RADIAL STIFFNESS VALUES (kg/mm) | | | |
|---|---|---|---|---|
| | deflated (0 b) | % change | inflated (2.4 b) | % change |
| A(ref.) | 23.4 | ref. | 33.9 | ref. |
| B | 29.5 | +21 | 37.4 | +10 |
| C(inv.) | 27.9 | +15 | 35.3 | +04 |

It is clear from this table that the tire of this invention (tire C) is one that provides the closest ride comfort to the control tire A and yet provides a much improved support for vehicle loads.

The cornering stiffness of the tires can also be measured to obtain the relative ability of the various run-flat tires in their ability to provide lateral forces that maneuver the vehicle. The Table below shows the same run-flat tires as described above where the improved cornering stiffness from a vehicle test with the tires deflated is given with respect to the two carcass ply tire A. The higher the value the better the run-flat tire corners.

| TIRE | CORNERING STIFFNESS VALUES (kg/deg.) | |
|---|---|---|
| | deflated (0 bars) | % change |
| A (ref.) | 60 | ref. |
| B | 90 | +50 |
| C (invention) | 83 | +38 |

The tire of this invention (tire C) provides better cornering values with respect to the control tire. Hence, the inventive tire (tire C) is a good compromise for luxury, family or urban-economy vehicles and the like. The addition of a run-flat stiffener ply (tire B) is more suited to sport or performance type vehicles which sacrifice ride comfort for high cornering requirements and because of the greater rear axle load bias. These vehicles have a load distribution being nearer to a 50/50 (front/back) percentage load distribution which requires higher cornering stiffness values for the rear tires to keep the vehicle from having a steering stability problem.

Providing the improved bead portion components of the rubber support portion 34, the reinforced rim seat ply 27, the first rubber seat portion 26 and the second rubber toe portion 28 improved the run-flat tire's cornering force magnitude. A P225/60 R16 deflated run-flat tire with these four added components had a fifty (50) percent increase in the cornering force over a tire without these components when tested at a 2 degree slip angle. A five (5) percent increase in radial stiffness was also obtained with these three components added to this run-flat tire.

From the above description of the preferred embodiments of the invention, those skilled in the art will perceive other improvements, changes and modifications within the skill of the art which are essentially covered by the appended claims.

Having described the preferred embodiments, what is claimed is:

1. A tire for mounting on a rim of a vehicle capable of sustaining vehicle loads at a contact patch in an effective manner with the loss of inflation pressure comprising:
a crown portion having a tread;
a belt package located radially inward of said tread;
an innerliner portion on the interior surface of the tire;
a pair of bead portions axially spaced apart and having a bead core and a bead filler;
a pair of axially spaced apart load bearing sidewall portions wherein each sidewall portion is disposed radially between a respective lateral edge of said crown portion of the tire and a respective bead portion, each sidewall portion having first and second crescent-shaped reinforcing members disposed outside said innerliner portion;
a middle carcass layer radially inward of the belt package and extending between each bead portion with turned-up portions from inside to outside around each bead core in such a manner to at least partially encompass said bead core and a respective bead filler;
an outer carcass layer disposed outside said middle carcass layer and each carcass turned-up portion and extending radially inward to at least a point axially outward and adjacent to each said bead core;
an inner carcass layer disposed to the inside of said middle carcass layer and extends under the crown portion then radially inward between the first member and the second member of the crescent-shaped reinforcing members in each sidewall to at least a point axially inward and adjacent to each said bead core, said carcass layers each having a plurality of substantially parallel reinforcing members and a curvilinear configuration.

2. The tire set forth in claim 1, wherein said belt package further comprises at least two belts and a cap ply, wherein a wider inner belt extends beyond the lateral edge of at least one outer belt, said belts having their outer surface area covered by the cap ply with a width to extend beyond each lateral edge of the belts, said belt package being symmetrical with respect to a midcircumferential plane.

3. The tire set forth in claim 2, wherein said belt package has substantially parallel reinforcing members in each of the belts made of either a steel material or an aromatic polyamide material disposed at an acute angle with respect to a midcircumferential plane of the tire.

4. The tire set forth in claim 1, wherein said first and second crescent-shaped reinforcing members are approximately equal in shape and thickness and are made of substantially the same material having a modulus of elasticity in compression at 10 percent unit strain in the range of about 7.0 to about 15.0 megaPascals (MPa).

5. The tire set forth in claim 1, wherein said first crescent-shaped reinforcing member between the middle and inner carcass layers has a Shore A hardness in a range of approximately 40 to 55 and a modulus of elasticity in compression at 10 percent unit strain in a range of approximately 2.0 to 4.0 megaPascals (MPa) and said second crescent-shaped reinforcing member between the inner carcass layer and the innerliner portion has a Shore A hardness in a range of approximately 70 to 90 and a modulus of elasticity in compression at 10 percent unit strain in a range of approximately 7.0 to 15.0 MPa.

6. The tire set forth in claim 1, wherein a thickness of each load bearing sidewall portion including a sidewall rubber, the inner, middle and outer carcass layers, the first and second crescent-shaped reinforcing members, the bead filler portion and the innerliner portion is approximately constant over its radial extent and such sidewall portion has a width of about 6 percent to about 8 percent of a section width of the tire.

7. The tire set forth in claim 1, wherein each bead portion further includes a rubber support portion, a rim seat ply, a first rubber seat portion to support the seat ply and a second rubber toe portion located axially and radially inward of the bead core, said rubber support portion and said toe portion also help support the seat ply and keep the tire on the rim by contact of the seat ply with the rim and a flange of the rim at a tire/rim interface.

8. The tire set forth in claim 7, wherein said rim seat ply has square woven fabric reinforcing members made of any suitable material from the group consisting of nylon, polyester, rayon and aromatic polyamide, said first rubber seat portion being located radially outward and axially inward of the rim seat ply has a tension modulus of elasticity at 10 percent unit strain in a range of approximately 6.5 to 9.0 megaPascals (MPa) and said second rubber toe portion being located axially and radially inward of the bead core has a tension modulus of elasticity at 10 percent unit strain in a range of approximately 45 to 60 MPa.

9. The tire set forth in claim 1, wherein said bead core is made from a metallic or an aromatic polyamide material having a tensile strength at one percent unit strain in a range of approximately 900 to 2500 Newtons per square millimeter and a torsional rigidity of at least 90 Newton meters per radian for a test sample 100 millimeters long, whereas the bead portion of said run-flat tire remains on the rim during maneuvers of the vehicle.

10. The tire set forth in claim 9, wherein the bead core has a torsional moment of inertia of its cross-sectional area of at least about 125 millimeters to the fourth power.

11. The tire set forth in claim 1, wherein reinforcing members of the outer and middle carcass layers are cords made of any suitable material from the group consisting of nylon, polyester, rayon, aromatic polyamide and polyethylene napthalate.

12. The tire set forth in claim 1, wherein the modulus of elasticity of the inner carcass layer in compression at 10 percent unit strain is at least equal to 75 megaPascals (MPa) when confined between the first and second crescent-shaped reinforcing members.

13. The tire set forth in claim 12, wherein reinforcing members of said inner carcass layer are cords made of any suitable material from the group consisting of rayon, nylon, aromatic polyamide and polyethylene naphthalate.

14. The tire set forth in claim 1, wherein the carcass turn-up portions of said middle carcass layer extend outward a radial distance from a bead reference in each bead portion a distance in a range of 25 to 40 percent of a section height of said tire after loss of inflation pressure and with a nominal load as initially supported by the tire when inflated.

15. The tire set forth in claim 1, wherein said carcass turned-up portions of said middle carcass layer extend radially outward from a bead reference in each bead portion a distance in the range of 15 to 40 percent of a section height of said tire when cured.

16. The tire set forth in claim 1, wherein each bead filler has an apex radially outward of the bead core, said apex being positioned radially outward of a bead core reference a distance approximately 40 to 60 percent of a section height of said tire when cured.

17. A tire and rim system capable of sustaining vehicle loads in an effective manner with the loss of inflation pressure comprising:
   a crown portion of the tire having a tread;
   a pair of tire bead portions each having a bead core, a bead filler, a rim seat ply in contact with the rim, a first rubber seat portion and a second rubber toe portion located axially and radially inward of the bead core;
   a tire middle carcass layer having carcass turned-up portions from inside to outside around each bead core in such a manner to at least partially encompass said core and a respective bead filler;
   a tire outer carcass layer disposed outside said middle carcass layer and each carcass turned-up portion and extending radially inward to at least the radial extent of said bead core;
   a pair of axially spaced apart tire load bearing sidewall portions wherein each sidewall portion is disposed radially between a respective edge of said crown portion of the tire and a respective bead portion, each sidewall portion having first and second crescent-shaped reinforcing members disposed between said middle carcass layer and an innerliner portion;
   an inner carcass layer disposed inside said middle carcass layer and positioned between the first member and the second member of the crescent-shaped reinforcing members in each sidewall and extending radially inward to at least a point axially interior and adjacent to each bead core, said carcass layers each having a plurality of substantially parallel reinforcing members and a curvilinear configuration and each carcass layer being continuous from bead to bead, wherein the position of said inner carcass layer produces a stepwise radial stress distribution between said first and second crescent-shaped reinforcing members axially across the inner carcass layer on a median plane adjacent to a central radial plane of a contact patch and reduces counter deflection of a surface of the tread; and
   a rim having a hump disposed at the axially innermost end of the rim seat ply of the mounted tire, wherein said hump may engage the rim seat ply and whereas the tire remains seated on said rim of the vehicle during vehicle maneuvers as well as during straight ahead running.

18. The tire and rim system set forth in claim 17, wherein a distance from the center of the bead core to a base point on the hump of said rim is in a range of 12 to 16 millimeters.

19. The tire and rim system set forth in claim 17, wherein said bead core is made from a metallic or an aromatic polyamide material having a torsional rigidity of at least 90 Newton meters per radian for a test sample 100 millimeters long and a tensile strength at one percent unit strain in a range of approximately 900 to 2500 Newtons per square millimeter.

20. The tire and rim system set forth in claim 19, wherein said bead core has a torsional moment of inertia of its cross-sectional area of at least about 125 millimeters to the fourth power.

21. The tire and rim system set forth in claim 17, wherein said second rubber toe portion has a modulus of elasticity in tension at 10 percent unit strain in a range of approximately 45 to 60 MegaPascals.

* * * * *